United States Patent [19]
Moore et al.

[11] Patent Number: 4,589,809
[45] Date of Patent: May 20, 1986

[54] STUD FASTENER

[76] Inventors: Richard B. Moore, 1285 Balmoral, Mt. Clemens, Mich. 48043; Kenneth R. McClintock, 15944 Chelmsford, Mt. Clemens, Mich. 48044

[21] Appl. No.: 529,158

[22] Filed: Sep. 2, 1983

[51] Int. Cl.⁴ .............................................. F16B 39/00
[52] U.S. Cl. .................................... 411/166; 411/372; 411/533
[58] Field of Search ............... 411/166, 337, 352, 353, 411/371, 372, 373, 377, 533, 119, 120, 121, 176, 401, 83; 403/22, 21, 408

[56] References Cited

U.S. PATENT DOCUMENTS

| | | |
|---|---|---|
| 1,127,596 | 2/1915 | Crabiel ............................ 411/401 X |
| 1,410,634 | 3/1922 | White ............................. 411/401 X |
| 2,099,116 | 11/1937 | Kalmbach ....................... 411/401 X |
| 2,549,357 | 4/1951 | Angelone ........................ 411/401 X |
| 2,632,929 | 3/1953 | Poupitch ......................... 411/83 X |
| 2,634,940 | 4/1953 | Karty ............................. 411/83 X |
| 2,678,585 | 5/1954 | Ellis .............................. 411/908 X |
| 4,470,735 | 9/1984 | Salisbury ......................... 411/353 |

FOREIGN PATENT DOCUMENTS

| | | | |
|---|---|---|---|
| 40096 | 9/1973 | Australia .............................. | 403/22 |
| 1454288 | 9/1966 | France ................................ | 411/337 |

Primary Examiner—Kenneth J. Dorner
Assistant Examiner—Adrian H. Whitcomb, Jr.
Attorney, Agent, or Firm—Barnes, Kisselle, Raisch, Choate, Whittemore & Hulbert

[57] ABSTRACT

A fastener with a metal stud removably receivable in a plastic carrier member. A shank of the stud is inserted through a hole in the carrier member and an enlargement on the shank limits the extent to which the shank can be pushed through the hole. The stud is retained in the carrier member by entrapment of a portion of the carrier member surrounding the hole between the enlargement and a ring on the shank which has an interference fit with the hole. To facilitate inserting the ring into and removing it from the hole, the sides of the ring are tapered. The carrier member can be journaled on the shank to rotate freely with respect to the stud. If it is desired to prevent this rotation, the enlargement can have a non-circular configuration and be received in a mating non-circular recess in the carrier member.

22 Claims, 8 Drawing Figures

STUD FASTENER

FIELD OF THE INVENTION

This invention relates to fasteners and more particularly to a fastener with a metal stud removably connectable to a plastic carrier member, plate, article or the like.

BACKGROUND OF THE INVENTION

Previous fasteners include a metal stud permanently fixed in a plastic part by placing the stud in an empty die cavity so that the stud is molded directly into the part. Sometimes various forms of expansion inserts or threaded studs are inserted into holes molded or drilled in plastic parts. In some other fasteners the studs are upset or staked in plastic members which removes a portion of any corrosion protective coating on the studs. These techniques usually increase the cost of dies, tooling and fixtures, assembly time, and the number of scrap or unacceptable parts. These techniques also produce stresses in the plastic which result in more frequent cracking and failure of the parts when in service or use.

SUMMARY OF THE INVENTION

In brief, this fastener invention has a metal stud which is removably received in a hole in a plastic member such as a plate, part, article, or the like. The stud receiving hole can be molded in an article or formed in a separate plastic member which can be secured to the article. The extent to which a shank of the stud can be inserted through the hole is limited by an enlargement or head on the shank which bears on a portion of the plastic member adjacent the hole. The stud is releasably retained in the hole by a ring on the shank which is spaced from the enlargement so that a portion of the plastic member surrounding the hole is entrapped between the head and the ring. So that the stud is releasably retained in the hole, the ring has an interference fit with the hole. If desired, rotation of the stud relative to the plastic member can be prevented by providing the enlargement with a non-circular configuration which mates with and is received in a complimentary non-circular recess in the plastic member.

Objects, features and advantages of this invention are to provide a stud and fastener in which the stud is not fixed or molded in a plastic member, stress cracking of a plastic member or article is eliminated, heat shrink problems produced by a metal stud in molding a plastic member or article are eliminated, tooling and assembly costs are decreased, tooling and mold design is simplified, part breakage during assembly is decreased, the amount of material in and weight of a finished product is decreased, and the push in and pull out strength is substantially increased, the maximum torque load is substantially increased, the design and assembly is simplified, and the fastener may be assembled and disassembled several times and is of economical manufacturer and assembly.

BRIEF DESCRIPTION OF THE DRAWINGS

These and other objects, features and advantages of this invention will be apparent from the following detailed description, appended claims and accompanying drawing in which

DETAILED DESCRIPTION OF THE INVENTION

Figure 1:
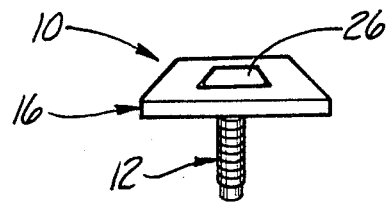
FIG. 1 is a perspective view of a fastener embodying this invention.
Figure 2:
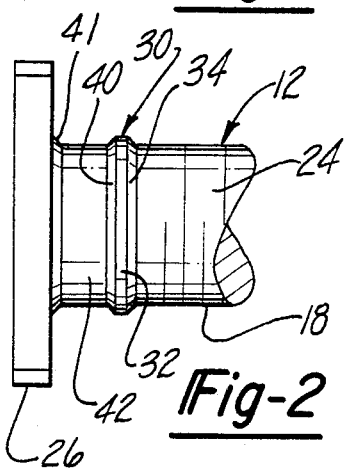
FIG. 2 is an enlarged fragmentary view of the stud of the fastener of FIG. 1.

Referring in more detail to the drawing, FIGS. 1-4 illustrate a fastener 10 embodying this invention which has a stud 12 of metal removably received in a hole 14 in carrier plate member 16 of plastic. The carrier member 16 is preferably molded and may be made of any suitable plastic material such as acetal, nylon, polypropylene, and the like.

Stud 12 has a shank 18 which can be inserted through a bore 20 in the plastic member. To facilitate inserting the stud, the maximum outside diameter of the shank 18 is no greater than and preferably somewhat smaller than the minimum inside diameter of the bore 20 in the plastic member. To further facilitate insertion, preferably the shank 18 has a reduced diameter pilot portion 22 on its free end. To facilitate securing an article to the stud, preferably the shank 18 has threads 24 thereon.

To limit the extent to which the stud can be inserted into the hole 14, an enlargement or head 26 on one end of the shank butts or bears on the bottom of a recess 28 in the plastic member which overlies and preferably is coincident with the bore 20. To prevent relative rotation between the stud 12 and the carrier member 14, such as when torque is applied to the stud, head 26 has a non-circular and preferably rectangular or hexagonal configuration which mates with and engages the sidewalls of a complimentary configuration of the recess 28.

To releasably retain the stud 12 in the carrier member 16, a ring 30 on the shank 18 has an interference fit with the bore 20 and is axially spaced from the head 26 so that it bears on the outer edge of the bore 20. The maximum outside diameter of the central portion 32 of the ring is greater than both the maximum outside diameter of the shank 18 and the minimum inside diameter of the bore 20 in the carrier member so that the ring has an interference fit with the bore. For fasteners having a diameter of the bore 20 in the range of about 0.1 to 1.0 inch this interference fit is in the range of about 0.006 to 0.002 of an inch and typically about 0.004 to 0.0006 of an inch. Normally, a greater interference fit is utilized with a smaller diameter bore.

To facilitate inserting the stud, preferably the leading side 34 of the ring 30 tapers into the shank 18 and the leading edge of the bore 20 in the carrier member has a chamfer 36. To prevent the trailing edge 38 of the bore 20 from being torn or otherwise damaged when the stud is inserted, the trailing side 40 of the ring 30 also tapers into the shank 18 of the stud. The ring 30 also tends to accurately size the bore 20 by shaving or removing a small amount of material from the bore. Preferably, each side 34 and 40 of the ring is inclined to the axis of the shank at an acute included angle which is usually in the range of about 10° to 75°, typically in the range of about 15° to 60°, desirably in the range of about 20° to 40° and preferably about 30°. Removal of the stud from the carrier member is also facilitated by the tapered side 40 of the ring. Preferably, a complementary tapered portion 41 blends the shank 18 into the head 26.

Figure 3:
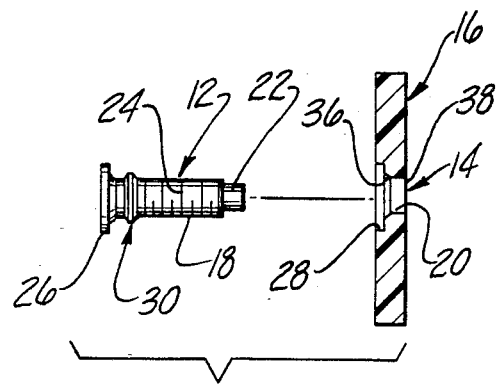
FIG. 3 is an exploded side view of the stud and plastic member in section of the fastener of FIG. 1.
Figure 4:
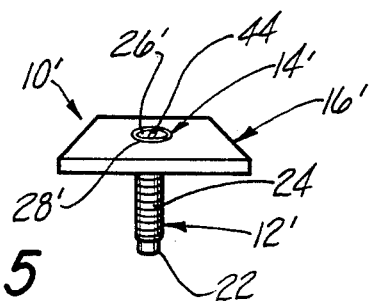
FIG. 4 is a side view partially in section of the stud and plastic member in assembled relation of the fastener of FIG. 1.

As shown in FIG. 4, when the stud is received in the carrier member, the plastic material adjacent bore 20 is elastically deformed and received in a groove 42 defined by the head 26, ring 32 and the intervening portion of the shank 18 as shown in FIG. 3. To enhance retention of the stud in the carrier member, preferably the configuration of the groove 42 and the axial spacing between the head 26 and the ring 32 in relation to the length of the hole 20 is such that the portion of the carrier plate immediately surrounding the hole is compressed and firmly received in the groove.

In using the fastener 10, the stud 12 is assembled or connected to the carrier member 16. The shank 18 of the stud is inserted in the carrier member 16 and the stud is forced or pushed into the hole until a portion of the carrier member immediately surrounding the bore 20 snaps into the groove 42 in the stud. As the shank 18 is pushed into the hole 14, the leading face 34 of the ring 30 engages the leading edge 36 of the bore 20 and cams or moves the adjacent plastic material generally radially outward. As the shank continues to advance, the surrounding plastic material snaps or moves generally radially into the groove 42 so that it is received and entrapped between the head 26 and ring 30 of the stud. When the stud is removed from the carrier member, the face 40 of the ring 30 cams or moves the plastic material surrounding the bore 20 generally radially outward and as the ring passes through the bore the surrounding plastic material returns to essentially its original unstressed position shown in FIG. 3. Due to the memory of the plastic material, the stud 18 can be inserted into and removed from the carrier member several times which in many situations facilitates installation, use, reuse, and any necessary replacement of the fastener.

After the stud is inserted, the carrier member 16 can be attached to a workpiece or product (not shown). The carrier member 16 is attached to a workpiece of a plastic or similar material such as by ultrasonic welding, heat staking, adhesive bonding, or mechanical attachment. With many plastic workpieces use of a separate carrier member can be eliminated by molding or otherwise forming the through bore 20 and associated recess 28 directly in the workpiece. The plastic carrier member or workpiece also isolates the stud and thereby avoids any galvanic corrosion of the stud.

Typical fasteners 10 having a shank with National Fine 8-32 threads require a force in the range of 40-50 lbs. to push the stud 12 into assembled relation with the carrier member 16 and a force in the range of about 170-180 lbs. to snap the stud out of the carrier member. No rotation of the stud relative to the carrier member occurs when a nut is threaded and tightened down on the shank until either the threads are stripped or the stud breaks. Typically, the threads are stripped or the stud breaks when a torque of 32 to 35 inch lbs. is applied to the nut. The studs of these fasteners were formed in a cold heading machine of SAE-1010 steel and the plastic carrier plates were molded of nylon sold by E. I. DuPont DeMures and Co. of Delaware under the trade name Delrin 500.

The head of each stud is square with each side having a length of 0.275 of an inch and an axial thickness of 0.040 of an inch. The minimum diameter of the V-groove is 0.163 of an inch and the axial spacing between the head and the center of the ring is 0.092 of an inch. The central portion of the ring has a maximum outside diameter of 0.176 of an inch and an axial width of about 0.025 of an inch. Each side face of the ring is inclined to the axis of the shank at an acute included angle of about 30° and has an axial width of about 0.030 of an inch. The stud has an overall axial length including the thickness of the head of about 0.60 of an inch and the pilot has an axial length of about 0.080 of an inch and a diameter of about 0.115 of an inch.

The carrier member is square with each side having a length of about 1.00 inch and a thickness of about 0.110 of an inch. The recess is square with an axial depth of about 0.045 of an inch and each side having a length of about 0.282 of an inch. The bore has a diameter of about 0.165 of an inch and a length including the chamfer of about 0.065 of an inch. The chamfer has a depth of about 0.018 of an inch and is inclined at an acute included angle to the axis of the bore of about 30°.

Figure 5:
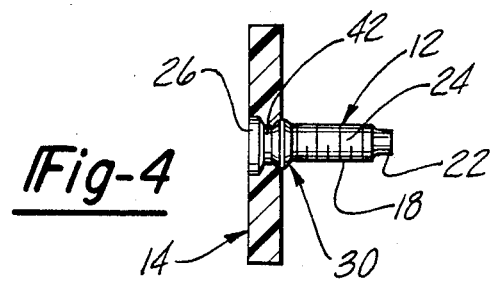
FIG. 5 is a perspective view of a modified fastener embodying this invention.

FIG. 5 illustrates a modified fastener 10' in which the stud 12' can be rotated to secure it to or release it from an object when the stud is received in the carrier member 16'. To permit the stud 12' to rotate relative to the carrier member the head 26' does not interlock with the recess 28' in the carrier member. Preferably the head 26' is circular, the recess 28' is cylinderical, and there is a slight clearance between the side walls of the recess and the head. To facilitate rotating the stud member 12', the head 26' has a slot 44 therein into which the tip of a screwdriver can be inserted.

Figure 6:
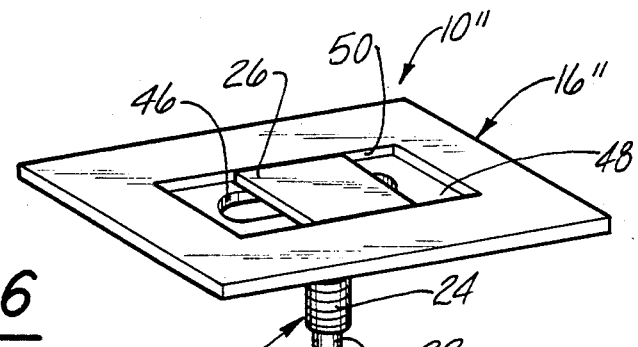
FIG. 6 is a perspective view of another modified fastener embodying this invention.

FIG. 6 illustrates a modified fastener 10" in which the stud 12 can be shifted laterally with respect to the carrier member 16" to facilitate alignment of the stud with an object to which it is to be secured. To permit the stud 12 to be shifted laterally, its shank 18 passes through an elongated slot 46 in the carrier member, rather than a bore 20, and its head 26 is received in a rectangular recess 48. The stud is releasably retained in the carrier member by engagement of the side edges of the slot 46 in the groove 42 of the stud and rotation of the stud is prevented by mating engagement of opposed edges of the head 26 with opposed walls 50 of the recess 48 which are parallel to an axis of the slot 46.

Figure 7:
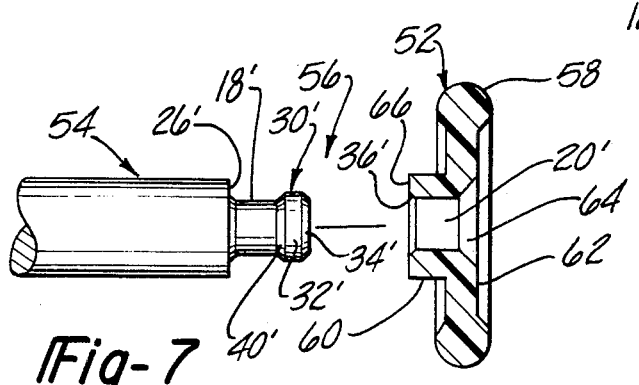
FIG. 7 is an exploded side view partially in section of another modified fastener embodying this invention.
Figure 8:
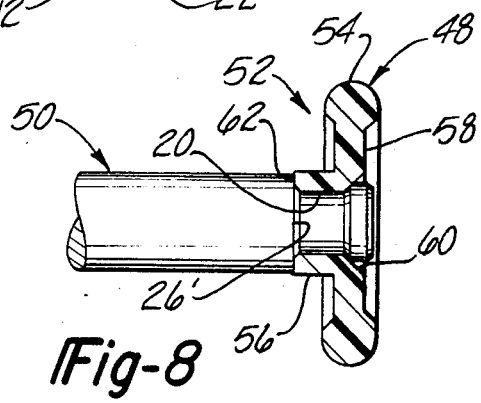
FIG. 8 is a side view partially in section of the modified fastener of FIG. 7 showing the component parts in assembled relation.

FIGS. 7 and 8 illustrate the mounting and journaling of a roller wheel 52 to rotate freely on a shaft 54 by a fastener 56 embodying this invention. Roller 52 is molded of a plastic material and has a round outer rim 58 and a central hub 60 interconnected by a web 62. The roller is journaled on the shaft 54 by a bore 20' through the hub which is coincident with the rim of the roller. To facilitate mounting the roller on and removing it from the shaft, chamfers 36' and 64 are provided on the leading and trailing edges of the bore. For journaling and mounting the roller wheel, the shaft 54 has a reduced diameter shank 18' with a retaining ring 30' on its free end. To retain the roller on the shank, the central portion 32' of the ring has a maximum outside diameter which is larger than and has an interference fit with the minimum inside diameter of the bore 20'. Inserting the ring through the bore is facilitated by the tapered face 34' of the ring and tearing or other damage to the plastic forming the bore 20' is prevented when the shank is pushed into the roller by the tapered side face 40' of the ring.

The extent to which the shank can be inserted into the bore 20' is limited by a shoulder or enlargement 26' on the shaft 54 when it abuts an end face 66 of the hub. To assure that the roller 52 rotates freely on the shaft 50, the maximum outside diameter of the shank 18' is preferably slightly less than the minimum inside diameter of the bore 20'and the axial spacing between the shoulder 26' and the face 40' is slightly greater than the axial distance between the end 62 of the hub and the chamfer 64.

To use the roller wheel 52, it can be readily mounted on the shaft 54 by pushing the shank 18' through the bore 20' in essentially the same manner as the stud 12 is mounted on the carrier member 16 of the fastener 10. To facilitate use, maintenance and any needed repair or replacement, the roller 52 can be readily removed from and reassembled to the shaft 54.

We claim:

1. A fastener comprising a plastic member having a stud receiving hole therethrough formed without engaging the stud and a non-circular recess therein overlapping said hole, said recess being wider than said hole, a metal stud removably receivable in said hole, said stud having a shank with a portion axially insertable through said hole with a maximum transverse dimension no greater than the minimum transverse dimension of said hole, an enlargement on said shank projecting outwardly generally transversely thereof and having a maximum transverse dimension greater than the minimum transverse dimension of said hole, said enlargement being constructed and arranged to bear on said plastic member to limit the extent to which said stud can be inserted through said hole in one direction, and having a non-circular configuration at least in part receivable in said recess in said plastic member and having at least one portion engagable with a complementary portion of said recess to prevent rotation of said stud with respect to said plastic member when said stud is received therein, and an enlarged ring on said shank extending outwardly generally transversely thereof with a maximum transverse dimension greater than that of said shank and less than that of said enlargement, being separate from and axially spaced from said enlargement, and constructed and arranged to form a circumferentially continuous groove therebetween into which a portion of the plastic member surrounding said hole extends when said stud is inserted into said hole with said portion of said plastic member received between said enlargement and said ring, said ring and said hole being dimensioned and constructed and arranged such they have an interference fit wherein said maximum transverse dimension of said ring is greater than the minimum transverse dimension of said hole, and said ring having a side adjacent said enlargement which is generally flat, circumferentially continuous, and inclined to the axis of said shank at an acute included angle in the range of about 10° and 75°, whereby said stud is releasably retained in said plastic member and prevented from rotating with respect to said plastic member when a portion of the plastic member surrounding said hole is received in said groove and disposed between said enlargement and said ring.

2. The fastener of claim 1 wherein said flat side of said ring is inclined to the axis of said shank at an acute included angle in the range of about 15° and 60°.

3. The fastener of claim 1 wherein said flat side of said ring is inclined to the axis of said shank at an acute included angle in the range of about 20° to 40°.

4. The fastener of claim 1 wherein said ring also has another side which is generally flat, circumferentially continuous, outside of said groove, and inclined to the axis of said shank at an acute included angle in the range of 10° to 75°.

5. The fastener of claim 1 wherein said ring also has another side which is generally flat, circumferentially continuous, outside of said groove, and inclined to the axis of said shank at an acute included angle in the range of 15° to 60°.

6. The fastener of claim 1 wherein said ring also has another side which is generally flat, circumferentially continuous, outside of said groove and inclined to the axis of said shank at an acute included angle in the range of 10° to 75°, and said plastic member also comprises, a chamfer on an edge of said hole in said plastic member immediately adjacent said recess, inclined to the axis of said hole at an acute included angle in the range of 10° to 75°, and generally complementary to said another side of said ring of said stud.

7. The fastener of claim 1 wherein said ring also has another side which is generally flat, circumferentially continuous, outside of said groove, and inclined to the axis of said shank at an acute included angle in the range of 10° to 75°, and an outer cylindrical surface generally co-axial with said shank and intersecting said another side to provide a sharp edge in conjunction therewith at the intersection thereof with said sharp edge having a diameter larger than the minimum diameter of said hole.

8. The fastener of claim 1 wherein said ring also has another side which is generally flat, circumferentially continuous, outside of said groove, and inclined to the axis of said shank at an acute included angle in the range of 15° to 60°, and an outer cylindrical surface generally co-axial with said shank and intersecting said another side to provide a sharp edge in conjunction therewith at the intersection thereof with said sharp edge having a diameter larger than the minimum diameter of said hole.

9. The fastener of claim 1 wherein the maximum dimension of said ring generally transverse to the axis of said shank is larger than the minimum transverse dimension of said hole by at least about 0.004 of an inch.

10. The fastener of claim 8 wherein the diameter of said sharp edge of said ring is larger than the minimum diameter of said hole by about 0.002" to 0.006".

11. The fastener of claim 1 wherein said enlargement and said side of said ring are dimensioned, constructed and arranged with respect to each other and said portion of said plastic member surrounding said hole such that when such portion of said plastic member surrounding said hole is received in said groove it is compressed between said enlargement and said side of said ring.

12. The fastener of claim 7 wherein said enlargement and said first mentioned side of said ring are dimensioned, constructed and arranged with respect to each other and said portion of said plastic member surrounding said hole such that when such portion of said plastic member surrounding said hole is received in said groove it is compressed between said enlargement and said first mentioned side of said ring.

13. The fastener of claim 7 wherein said plastic member comprises nylon.

14. A retainer member for a fastener having a retainer member and a metal stud having a shank, an enlargement on the shank projecting outwardly generally transversely thereof and having a non-circular configuration, and an enlarged ring on the shank extending outwardly generally transversely thereof with a maximum transverse dimension greater than that of said shank and less than that of said enlargement, being separate from and axially spaced from the enlargement and constructed and arranged to form a circumferentially continuous groove therebetween with the ring having a side adjacent the enlargement which is generally flat, circumferentially continuous, and inclined to the axis of the shank at an acute included angle of about 10° to 75°, the retainer member comprising: a plastic member having a stud receiving hole therethrough formed without engaging the stud and a non-circular recess therein overlapping said hole, said recess being wider than said hole, said hole having a minimum transverse dimension no smaller than the maximum transverse dimension of the shank of the stud, said recess having a non-circular configuration and being constructed and arranged to engage at least a portion of the enlargement of the stud to prevent rotation of the stud with respect to said plastic member when the enlargement is received in said recess, the minimum transverse dimension of said hole also being less than the maximum transverse dimension of the enlargement of the stud such that said plastic member also limits the extent to which the stud can be inserted through said hole in one direction, and said hole being constructed and arranged such that a circumferentially continuous and integral portion of said plastic member surrounding said hole extends into the groove in the stud and is received and releasably retained between the ring and the enlargement of the stud when it is inserted into the hole so that the ring passes through the hole, whereby the stud is releasably retained in said plastic member and prevented from rotating with respect to said plastic member when such portion of the plastic member surrounding said hole is received in the groove and disposed between the enlargement and the ring of the stud.

15. The retainer member of claim 14 wherein said hole has an interference fit with the ring of the stud of at least about 0.004 of an inch.

16. The plastic member of claim 14 which also comprises a chamfer on an edge of said hole in said plastic member immediately adjacent said recess and inclined to the axis of said hole at an acute included angle in the range of about 10° to 75°.

17. A stud member for a fastener having a stud member and a plastic member with a stud receiving hole therethrough formed without engaging the stud and a non-circular recess therein overlapping the hole and being wider than the hole, said stud member comprising: a metal stud having a shank with a portion axially insertable through the hole with a maximum transverse dimension no greater than the minimum transverse dimension of the hole, an enlargement on said shank projecting outwardly generally transversely thereof, having a maximum transverse diemsnion greater than the minimum transverse dimension of the hole and being constructed and arranged to bear on the plastic member to limit the extent to which the stud can be inserted through the hole in one direction, and having a non-circular configuration at least in part receivable in the recess in the plastic member with at least one portion engagable with a complementary portion of the recess to prevent rotation of the stud with respect to the plstic member when the stud is received therein, and an enlarged ring on said shank extending outwardly generally transversely thereof with a maximum transverse dimension greater than that of said shank and less that that of said enlargement, being separate from and axially spaced from said enlargement, and constructed arranged to form a circumferentially continuous groove therebetween into which a portion of the plastic member surrounding the hole extends when said stud is received in the hole with the enlargement in the recess, said ring being dimensioned and constructed and arranged such that it also has an interference fit wherein the maximum transverse dimension of said ring is greater than the minimum transverse dimension of the hole, and said ring has a side adjacent said enlargement which is generally flat, circumferentially continuous, and inclined to the axis of said shank at an acute included angle of about 10° to 75°, whereby said stud is releasably retained in the plastic member and prevented from rotating with respect to the plastic member when such portion of the plastic member surrounding the hole is received in said groove and disposed between said enlargement and said ring of said stud.

18. The stud member of claim 17 wherein said ring also has another side which is generally flat, circumferentially continuous, outside of said groove, and inclined to the axis of said shank at an acute included angle in the range of 10° to 75°.

19. The stud member of claim 17 wherein said ring also has another side which is generally flat, circumferentially continuous, outside of said groove, and inclined to the axis of said shank at an acute included angle in the range of 10° to 75°, and an outer cylindrical surface generally co-axial with said shank and intersecting said another side to provide a sharp edge in conjunction therewith at the intersection thereof with said sharp edge having a diameter larger than the minimum diameter of the hole.

20. The fastener of claim 19 wherein the diameter of said sharp edge of said ring is larger than the minimum diameter of said hole by at least about 0.004 of an inch.

21. The fastener of claim 19 wherein the diameter of said sharp edge of said ring is larger than the minimum diameter of said hole by about 0.002 to 0.006 of an inch.

22. The fastener of claim 17 wherein said enlargement and said side of said ring are dimensioned, constructed and arranged with respect to each other and the portion of the plastic member surrounding the hole such that when such portion of the plastic member surrounding the hole is received in said groove it is compressed between said enlargement and said side of said ring.

* * * * *